Jeanne Fanny Burger
Uli Raymond Burger-Straumann
Sole Heirs Of The Estate
Of The INVENTOR
Willy Burger, Deceased By Pierce, Scheffler & Parker
Attorneys

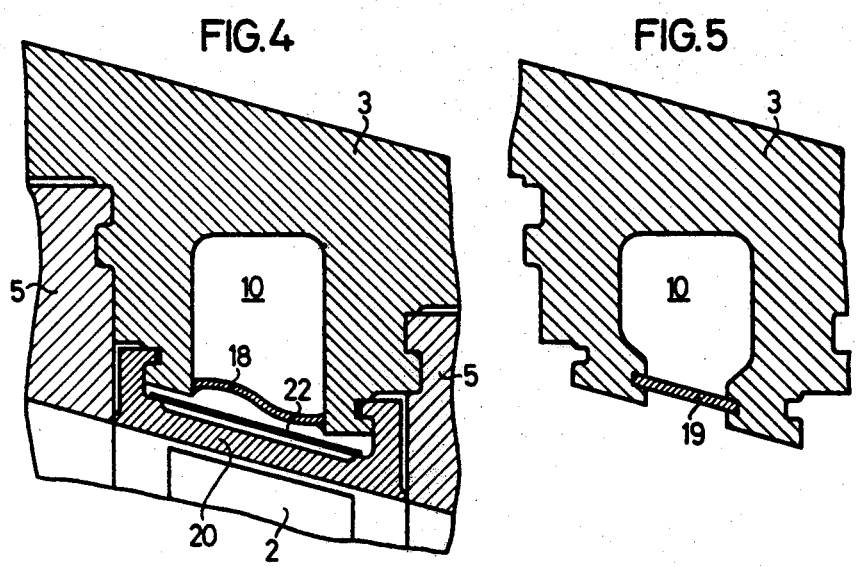

United States Patent Office 3,408,044
Patented Oct. 29, 1968

3,408,044
COMBUSTION GAS TURBINE WITH COOLED
GUIDE VANE SUPPORT STRUCTURE
Willy Burger, deceased, late of Wettingen, Switzerland, by
Jeanne Fanny Burger and Uli Raymond Burger-Straumann, sole heirs, Wettingen, Switzerland, assignors to
Aktiengesellschaft Brown, Boveri & Cie., Baden,
Switzerland, a joint-stock company
Filed July 19, 1966, Ser. No. 566,395
Claims priority, application Switzerland, July 23, 1965, 10,329
6 Claims. (Cl. 253—39.1)

ABSTRACT OF THE DISCLOSURE

A cooling arrangement for the support structure for the rows of stationary guide vanes of a multi-stage combustion gas turbine comprises arcuate and circumferentially extending cooling channels located respectively at the radially inner side of the guide vane support structure between adjacent rows of guide vanes. Pressurized cooling air is caused to flow through the channels and all of the cooling air after passing through the channels is conducted to the combustion gas inlet of the turbine in advance of the first row of rotor vanes whereby substantially the entire pressure gradient of the cooling air is transformed into work in the turbine.

---

The present invention relates to an improvement in the construction of multi-stage gas turbines and more particularly to an improved arrangement for cooling the support structure for the stationary, guide vanes of the turbine.

It is already known to cool the support structure for these vanes by means of cooling pipes arranged on the outer wall of the housing. Also, it is known to internally cool the vane supports wherein cooling air flows through longitudinal bores in the vane attachments and in heat barrier segments arranged between the vane attachments. These known cooling arrangements for the vane supports have the disadvantage that greater temperature differences occur in the vane support wall, and because of this, undesirable thermal stresses are created. Further, the bores in the vane attachments and segments are easily obstructed by dirt, and air loss due to leakage at the packing points between the segments and the vane attachments is difficult to avoid.

The object of the present invention is to avoid these disadvantages and to improve the efficiency of the gas turbine. In accordance with the invention the vane support structure of the turbine is cooled by a pressurized air coolant passed through cooling channels arranged at the radially inner side of the vane support and this cooling air is thereafter admixed to the combustion gases ahead of the first stage of the rotor vanes, so that at least approximately its entire pressure gradient is transformed into mechanical work in the gas turbine.

The foregoing as well as other objects and advantages inherent in the invention will become more apparent from the following description of preferred embodiments and from the accompanying drawings wherein:

FIG. 4 is an enlarged sectional view showing one of the cooling air channels in greater detail; and FIG. 5 is also an enlarged sectional view showing a slightly modified construction for the inner cooling channel for use in the embodiment of FIG. 1.

Figure 1:
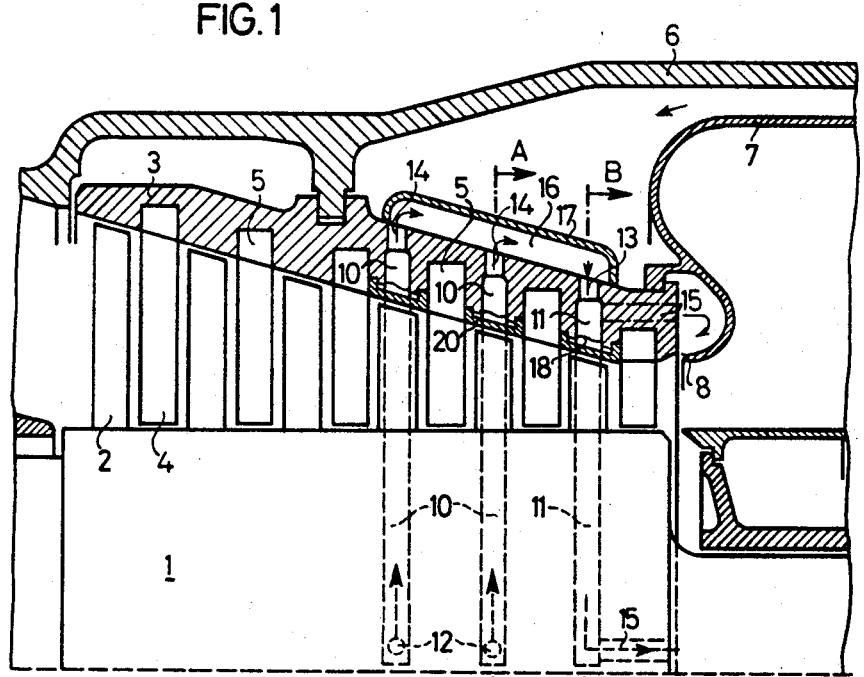
FIG. 1 is a fragmentary longitudinal section of the rotor section of a gas turbine illustrating an embodiment wherein the channels for flow of the air coolant lie on the inside of the vane support.

With reference now to the drawings, and to FIG. 1 in particular, the rotor of the gas turbine is indicated at 1 and is provided with rows of impeller vanes 2. A vane support 3 carries stationary guide vanes 4 in schematically shown vane attachments 5. Between an outer housing 6 and an inner shell 7 cooling air flows in the direction of the arrow to the turbine.

On the inner side of the vane support 3, cooling air channels 10 and 11 are arranged in circumferential direction between the vane attachments 5 for some of the rows of the stationary guide vanes 4. A portion of the cooling air flows through inlet apertures 12, see also FIG. 2, into the arcuate cooling air channels 10 and leaves them through outlet apertures 14.

Thereupon the cooling air is passed through a channel 16 established on the outer wall of the vane support 3, which channel is limited by a casing part 17, to the cooling air channel 11 having an inlet aperture 13. After flowing through the channel 11, the cooling air passes longitudinally through apertures 15 to the blading entrance 8 for the first stage of the turbine where it becomes admixed with the combustion gas delivered to the turbine from the combustion chamber, not illustrated. To throttle heat incidence, arcuate heat barrier segments 20 are arranged at the radially inner side of the vane support 3 between channels 10, 11 and the impeller vanes 2. They consist, for example, of a scale-proof steel having a low heat conductivity and serve to minimize transfer of heat from the hot gases to the guide vane support structure. The pressurized cooling air is advantageously a portion of the air furnished by the preceding compressor, all of the air used for cooling being conducted to the vane entrance of the first stage of the turbine after passage through the cooling air channels. For the circulation of the cooling air in the vane support of a turbine there is thus available the pressure drop of the combustion chamber, not illustrated, located between compressor and turbine. The cooling channels 10 and 11 can be connected in parallel and/or in series, depending on the desired pressure drop.

Figure 2:
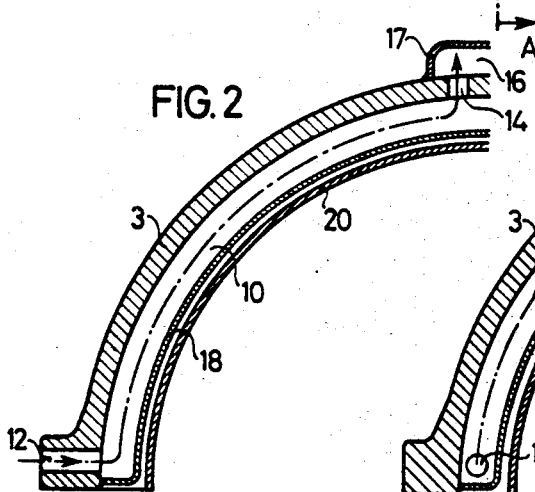
FIG. 2 is a sectional view taken on line A—A of FIG. 1.

In FIG. 2, a cooling air channel 10 is shown in section along line A—A of FIG. 1. The cooling air passes through the apertures 12 in the vane support 3 into the channel 10, which is formed by the inner wall surface of the vane support 3 and an inserted channel wall 18. Through the outlet apertures 14 the cooling air flows into the manifolding channel 16. By 20 is designated again the arcuate heat barrier segment arranged for the protection of the channel wall 18.

Figure 3:
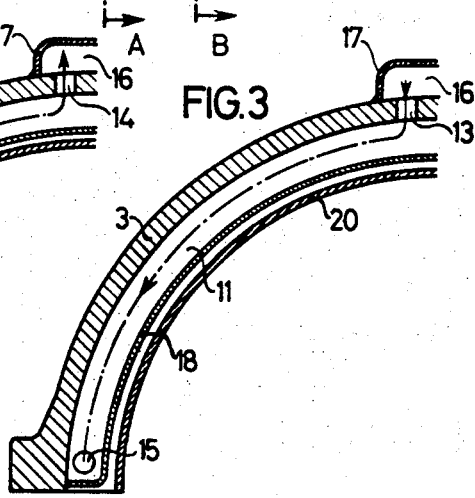
FIG. 3 is a sectional view taken on line B—B of FIG. 1.

In FIG. 3, the cooling air channel 11 of FIG. 1 is seen in section along line B—B. The cooling air flows from manifolding channel 16 through the inlet aperture 13 into the cooling air channel 11 and leaves it through outlet aperture 15 arranged in longitudinal direction. In FIG. 4, details of a cooling air channel are shown in greater detail. In the vane support structure 3, the channel 10 is arranged between the vane attachments 5 for adjacent rows of guide vanes 4. At its radially inner side, channel 10 is terminated by the arcuate channel wall 18, for example, in the form of a welded-in sheet. Between the cooling air channel 10 and the impeller vane 2 is located the inserted heat barrier segment 20. For further throttling of the incidence of heat, a radiation protection shield 22 is provided between the heat barrier segment 20 and the adjacent channel wall 18.

Instead of using welded-in sheets to serve as channel walls there may be provided sheets 19 which are mortised into position. This modification is illustrated in FIG. 5.

What is claimed is:

1. In a multi-stage combustion gas turbine, the combination comprising a housing, a rotor element within said housing having a plurality of rows of rotor blades, a guide vane support structure surrounding said rotor within and spaced from said housing, a plurality of rows of guide vanes carried by said support structure and located at opposite sides respectively of said rows of rotor vanes, arcuately and circumferentially extending cooling channels at the radially inner side of said guide vane support structure and located respectively between adjacent rows of guide vanes for the flow of pressurized cooling air, each said cooling channel having an inlet aperture at one end for entry of pressurized cooling air and an outlet aperture at the other end for discharge of the cooling air, and air passage means connected to said outlet apertures of all of said cooling channels and which serve to conduct the entire quantity of said cooling air to the combustion gas inlet of said turbine in advance of the first row of rotor vanes for admixture with the combustion gases whereby substantially the entire pressure gradient of said cooling air is transformed into work in said turbine.

2. A multi-stage combustion gas turbine as defined in claim 1 and which further includes arcuate and circumferentially extending heat barriers located at the radially inner part of said guide vane support structure and interposed respectively between each the adjoining cooling channel and said row of rotor vanes.

3. A multi-stage combustion gas turbine as defined in claim 2 and which further includes an arcuate and circumferentially extending heat radiation protective shield located between each said heat barrier and the radially inner wall of the cooling channel correlated therewith.

4. A multi-stage combustion gas turbine as defined in claim 1 wherein said air passage means connected to the outlet apertures of all of said cooling channels is comprised of a longitudinally extending channel common to a plurality of cooling channels.

5. A multi-stage combustion gas turbine as defined in claim 1 wherein said inlet and outlet apertures of said cooling channels are arranged for flow of cooling air therethrough in parallel.

6. A multi-stage combustion gas turbine as defined in claim 1 wherein said inlet and outlet apertures of said cooling channels are arranged for flow of cooling air therethrough in series.

References Cited

UNITED STATES PATENTS

| 2,574,190 | 11/1951 | New | 253—39.15 |
| 2,584,899 | 2/1952 | McLeod | 253—39.15 X |
| 2,712,727 | 7/1955 | Morley et al. | 253—39.1 X |
| 2,625,793 | 1/1953 | Mierley et al. | 253—39.1 |
| 2,801,821 | 8/1957 | Burger | 253—39.1 |
| 2,863,634 | 12/1958 | Chamberlain et al. | 253—39.1 X |
| 3,286,461 | 11/1966 | Johnson | 253—39.15 X |

FOREIGN PATENTS

| 740,024 | 11/1955 | Great Britain. |
| 776,847 | 6/1957 | Great Britain. |
| 872,697 | 4/1953 | Germany. |
| 1,128,708 | 4/1962 | Germany. |

EVERETTE A. POWELL, JR., *Primary Examiner.*